US012141618B1

(12) United States Patent
Kaminsky et al.

(10) Patent No.: US 12,141,618 B1
(45) Date of Patent: Nov. 12, 2024

(54) DYNAMIC GENERATION AND PRESENTATION OF LOAD RECORDS FOR LOAD ALLOCATION

(71) Applicant: Amazon Technologies, Inc., Seattle, WA (US)

(72) Inventors: Philip Mark Kaminsky, El Cerrito, CA (US); Mohammadmohsen Moarefdoost, Seattle, WA (US); Priyanka Prakash Mhatre, Seattle, WA (US); Dorothy Mary Watts, Seattle, WA (US); Ruchit Aswin Shah, Bothell, WA (US); Ankur Gupta, Delhi (IN); Subhadeep Gupta, Burdwan (IN); Vishal Verma, Faridabad (IN); Niels Krohn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 458 days.

(21) Appl. No.: 17/512,002

(22) Filed: Oct. 27, 2021

(51) Int. Cl.
*G06F 9/50* (2006.01)
*G06F 16/9035* (2019.01)
*G06F 16/9038* (2019.01)

(52) U.S. Cl.
CPC .......... *G06F 9/505* (2013.01); *G06F 16/9035* (2019.01); *G06F 16/9038* (2019.01)

(58) Field of Classification Search
CPC ...................................................... G06F 9/505
See application file for complete search history.

(56) References Cited

U.S. PATENT DOCUMENTS

2021/0081848 A1* 3/2021 Polleri ................ G06F 11/3452
2022/0300862 A1* 9/2022 Löthman ............... G06F 3/0488

* cited by examiner

*Primary Examiner* — Charlie Sun
(74) *Attorney, Agent, or Firm* — Kilpatrick Townsend & Stockton LLP (57) ABSTRACT

A computer system may provide a plurality of load records for presentation in a user interface provided at a first plurality of user devices. The user interface may enable searching for a plurality of loads represented by the plurality of load records. The computer system may also determine, for a load record of the plurality of load records and based at least in part on inputting contextual information into a predictive model, an acceptance prediction indicating a probability that a load record of the plurality of load records will be accepted by a user. The computer system may also provide at least a portion of the plurality of load records for presentation in the user interface provided at a second plurality of user devices associated with a second plurality of users. The portion of the plurality of load records may include the load record including an updated value of an attribute of the load record that is dependent on the acceptance prediction.

20 Claims, 8 Drawing Sheets

DYNAMIC GENERATION AND PRESENTATION OF LOAD RECORDS FOR LOAD ALLOCATION

BACKGROUND

Heavy duty vehicles such as semi-trucks can be used to transport items along various routes, which may include, local, regional, and over-the-road (e.g., long haul) options. In some cases, a computer system may be used by a route authority to share information about a set of future routes. Vehicle drivers may use a computer application to interact with the computer system to search for and select routes offered by the route authority.

BRIEF DESCRIPTION OF THE DRAWINGS

Various examples in accordance with the present disclosure will be described with reference to the drawings, in which.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, techniques for dynamic generation and presentation of load records for load allocation. The load records may represent actual physical routes used for transporting goods within a transportation network. An operator of the transportation network may generate the load records based on logistical demands of the transportation network and make the load record available for acceptance by independent carriers (e.g., trucking companies that are operated by entities other than the operator of the transportation network). For example, the operator may publish the load records to a load board at which the carriers can search, view, and select routes that are suitable. The load records may include various attributes that define physical characteristics of the load routes (e.g., starting location, ending location, miles, stops, etc.) and, in some examples, define the economic terms for acceptance of the load routes (e.g., price to be paid for route). As part of providing the load routes for review and acceptance by the independent carriers, a service provider associated with the operator may provide a computer application to display the load board. The computer application may include a user interface that facilitates communication between the service provider and user devices used by users (e.g., users associated with the independent carriers). For example, responsive to requests from the user devices, the service provider may populate the user interface with load records, which can be searched, sorted, and/or otherwise filtered by the user devices.

Techniques described herein relate to how certain attributes of the load records that are presented in the user interface are generated and updated dynamically (e.g., responsive to interactions and/or the lack of interactions with respect to load records available for presentation in the user interface). For example, for select attributes, the service provider may utilize a multi-stage computing architecture to update the select attributes of load records at a predefined or computed frequency. This multi-stage computing architecture may use signals that are based on historical data, a current demand for the load records and similar load records, a supply of carriers potentially interested in accepting the load routes, and other signals as described herein. Updates to the select attributes may be used for updated presentation of the load records in the user interface. For example, the service provider may determine, from first interaction data, that a small number of carriers are using the user interface to search for load routes having certain attributes (e.g., ones that need to be accepted within some given time frame). The service provider may use this information about interactions as input into the multi-stage computing architecture to compute adjusted values for a certain attribute (e.g., price) of the load. Doing so, may improve the likelihood of acceptance by a user. Attributes of other similar load routes may also be considered when the adjusted values are computed. Once computed, the load records may be automatically updated and, when a refresh is requested, the updated load records (e.g., the ones with the new values for the attribute) may be populated in the user interfaces presented at the user devices.

Turning now to a particular example, a system is provided that includes a service provider (e.g., a collection of one or more service provider computers) that enables user device access (e.g., using a computer application such as a smartphone application, a web application, a desktop application, etc.) to a database of load records. The load records may be generated by the service provider based on current and future demand for movement of items within a transportation network managed by an entity associated with the service provider. Certain attributes of the load records may be static, while other attributes may be dynamically updated depending on current conditions defining a current context relating to the load records. The service provider may determine the current conditions by at least collecting contextual information relating to how users are reacting in real-time to the load records and similar load records, and other information relating to similar load records presented in connection with the subject load records. Values of the other attributes may be updated, at least in part, by inputting the current condition information into a multi-stage computing architecture. This architecture may include one or more machine learning models, dynamic programming algorithms, and the like configured to take the current condition information into account as part of determining updated values for the other attributes. Once updated, the load records may be updated to reflect the updated values for the other attributes. And the updated load records can be used to populate user interfaces responsive to user requests. This may enable the user devices to search, view, and accept load routes represented by the updated load records. Once a load record has been accepted, the service provider may remove the load record from being presented and may mark the corresponding load route as being accepted. This action may also cause other downstream systems, which may include automated systems, to perform additional operations. For example, the acceptance may function as a trigger for a loading system to begin loading a trailer with the items that are to be carried on the load route. Similarly, the acceptance may trigger a workflow for staging or otherwise preparing aspects of the items to be loaded into the trailer.

The techniques described herein improve the functioning of computer systems such as service provider systems and computer systems such as user devices. For example, information presented in user interfaces may be refreshed at a rate that is greater than previous systems were capable of doing. This may be possible because the models and other algorithms have been trained using large amounts of transaction data unavailable to other entities operating other similar service provider systems. Not only is the information in the user interfaces updated more frequently, but the values of certain attributes may be updated dynamically based on real-time interest in the corresponding load route and/or other load routes. This results in a practical application of the techniques describe herein that involves a results-driven and real-time interaction data based approach for distributing load records.

Additionally, as described in some examples, the techniques described herein improve efficiency of using the user devices to perform acceptance of load routes by reducing the number of clicks, selections, scrolling operations, new webpages, page refreshes, and the like required for a user to complete the acceptance process using a user interface.

Figure 1:
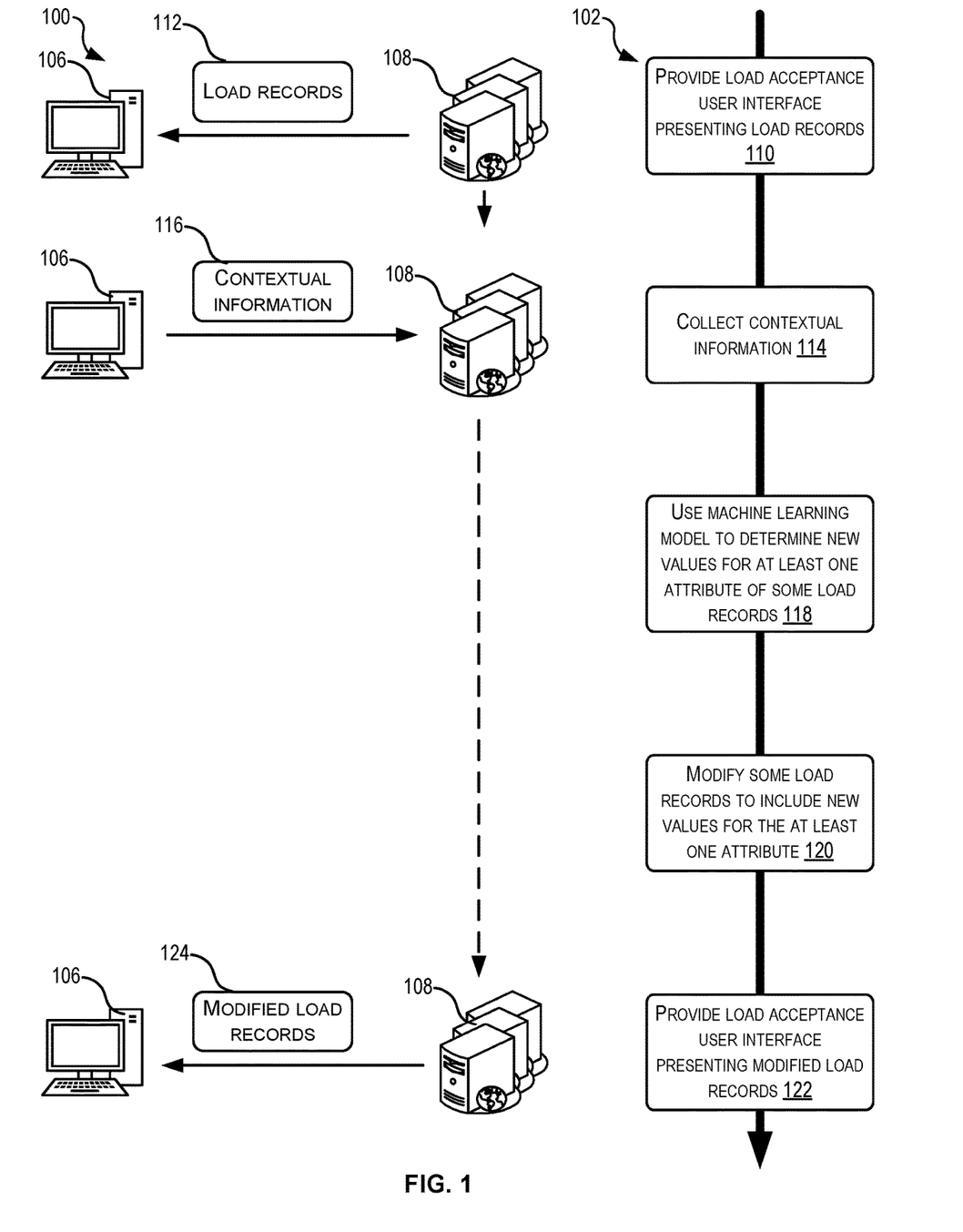
FIG. 1 illustrates an example block diagram and associated flowchart showing a process for implementing techniques relating to dynamic generation and presentation of load records for load allocation, according to at least one example.

Turning now to the figures, FIG. 1 illustrates an example block diagram 100 and associated flowchart showing a process 102 for implementing techniques relating to dynamic generation and presentation of load records for load allocation, according to at least one example. The diagram 100 depicts devices, objects, and the like that correspond to the process 102. The process 102 can be performed by any suitable combination of hardware and/or software as implemented by a service provider computer (e.g., service provider 108). The service provider 108 may maintain load records for many load routes (e.g., hundreds, thousands, tens of thousands, hundreds of thousands, etc.) and provide user interfaces for users (e.g., using applications on user devices 106) to search, view, and/or accept load routes. This may include the service provider 108 responded to user requests from the user devices 106 in the form of webpages, web services, and the like for facilitating researching and accepting of load routes.

The process 102 may begin at block 110 by the service provider 108 providing a load acceptance use interface that presents load records 112 for presentation at the user device 106. While a single user device 106 is illustrated, it should be understood that the service provider 108 may provide information for populating the load acceptance user interface to many user devices 106 simultaneously. The load records 112 may be generated by the service provider 108 using techniques described herein and/or any other suitable technique for allocating logistical demands within a transportation network. The transportation network may be defined to include any suitable region (e.g., county, area, state, country, region, world, etc.). Each load record 112 may include a set of attributes that define a load route. The load acceptance user interface may present at least some of the set of attributes for relevant load records 112 upon request from the user device 106. For example, prior to block 112, the user device 106 may submit a request to the service provider 108 to search for a set of load records based on one or more attributes.

At block 114, the process 102 includes the service provider 108 collecting contextual information 116. The contextual information 116 may represent characteristics of a current supply of users and characteristics of a current demand of loads to be fulfilled by the users. The contextual information 116 may be derived from information presented and generated when the load records 112 are presented at block 110. For example, interactions of users of the user devices 106 may be logged by the service provider 108. These interactions may include, for example, submitted search queries, dwell times on page, dwell time on user interface element, requests for detailed views, opening and closing of records, and the like. The information presented may represent which load records are presented while the interactions are being logged and how the attributes of those load records may influence the interactions of the user. For example, if multiple load records are for similar a distance, but one is advertised at a lower price than the others, and that one is not being accepted, the system may determine that a value of the price attribute should be increased for the one.

At block 118, the process 102 includes the service provider 108 using machine learning techniques to determine new values for at least one attribute of some load records. As introduced herein, this may include increasing or decreasing a price attribute and/or adjusting other attributes. In some examples, the machine learning techniques may be implemented in a multi-stage computing architecture, which may include one or more machine learning models, customized algorithms, and the like configured to take into account the context in which the load records 112 were presented at block 110 (e.g., as represented, in part, by the contextual information 116) and compute new values based on the same. These new values may include a sequence of values for future adjustments at some defined frequency or in a more arbitrary manner.

At block 120, the process 102 includes the service provider 108 modifying some load records to include the new values for the at least one attribute. As described herein, for example, this may include updating a price attribute of one or more load records. Modifying the load record may include modifying the load records within a database, in memory, or stored in any other suitable manner.

At block 122, the process 102 includes the service provider 108 providing the load acceptance user interface presenting modified load records 124. The modified load records 124 are the records modified at block 120. The modified load records 124 may be presented within the user interface at the user device 106. In some examples, the process 102 may be repeated iteratively as the modified load records are presented, interacted with by users, and updated again. In some examples, the block 118 may determine a sequence of changes to the attributes that may be implemented over time. In this manner, the process 102 may forecast a set of values for an attribute over time (e.g., between a current time and a drop dead time at which the route must be assigned in order to be timely).

Figure 2:
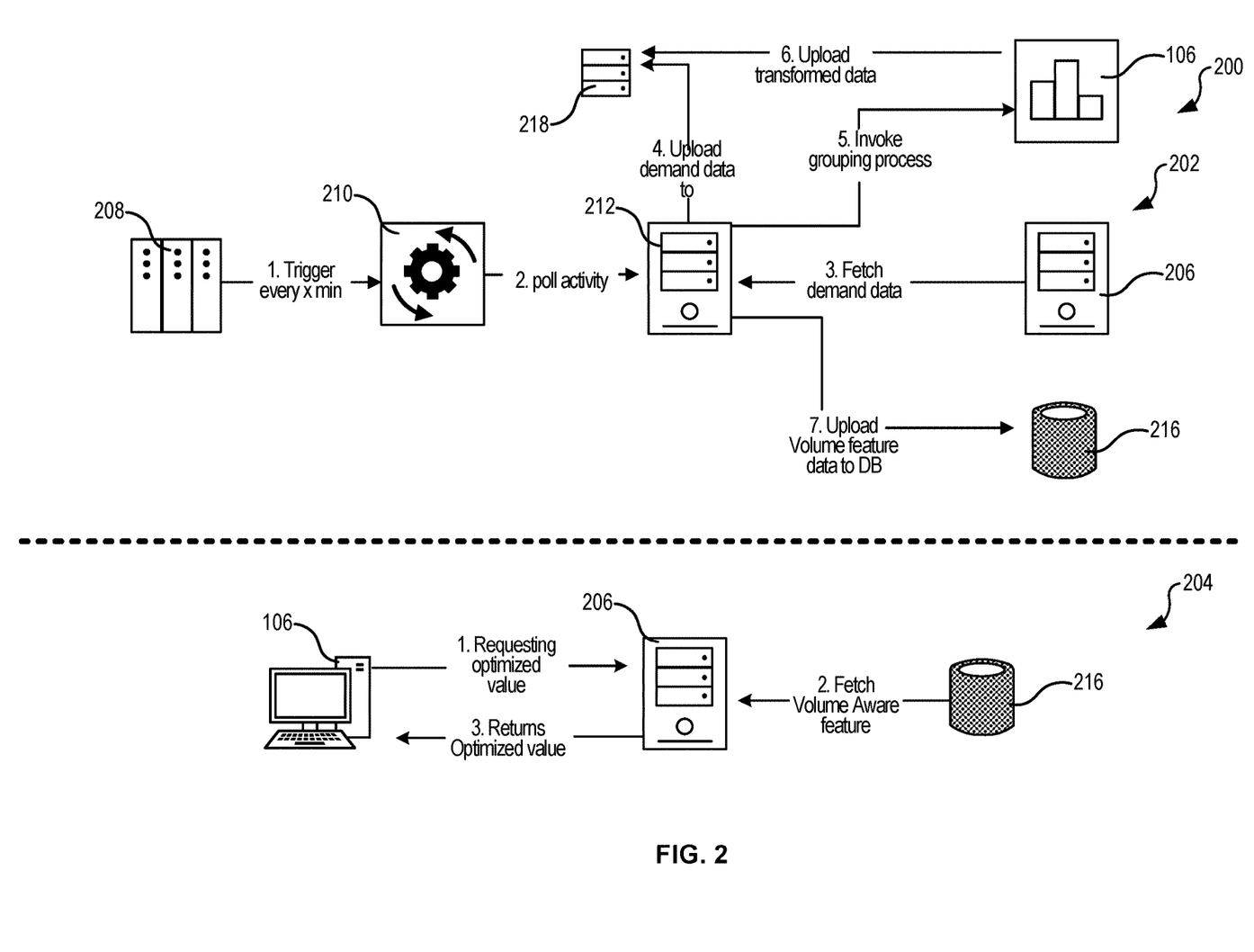
FIG. 2 illustrates an example demand-based architecture and two corresponding processes for implementing techniques relating to dynamic generation and presentation of load records for load allocation, according to at least one example.

FIG. 2 illustrates an example demand-based architecture 200 and two corresponding processes 204 and 206 for implementing techniques relating to dynamic generation and presentation of load records for load allocation, according to at least one example. Generally, each load record may include an acceptance prediction, which, in some examples, may be a curve that indicates probability of the load being accepted at a range of attribute values (e.g., different prices). The processes implemented by the demand-based architecture 200 may take into account real-time demand using the number of load records (e.g., volume) available for acceptance at any current time as an indicator of demand within a particular market (e.g., load records originating out of Seattle, WA). The processes implemented by the demand-based architecture 200 may adjust the acceptance predictions based on the amount of similar load volume at a point in time and the expected volume for the future of that load. For example, this may include taking into account: (1) similar loads, (2) future volume, and (3) refresh frequency.

Similar loads, e.g., loads with same zip code, same departure time, etc. may include ones that compete for the same group of carriers. Estimated future volume may include using machine learning to predict load acceptance at each point between the present and the time at which the load must convert, meaning the architecture 200 may use expected features of the load at future points to find the optimal value for a certain attribute. Due to the nature of the model, the techniques described herein may use predictions of future load volume in addition to real-time volume data. Refresh frequency may include ingesting real-time value adjustment.

A similar load may be a product of one or more of attributes: (a) time span—for a given value, what is the most effective time span in defining similar volume; (b) geographical density—for a given value, what is the most relevant geographical density; and (c) departure time—what is the importance of departure time of similar loads.

Future volume may include using dynamic programming to provide an optimal value for the attribute in question, especially, as it relates to future states. In some examples, the future volume may be a constant future volume (e.g., consider the same volume in the future as currently known), a zero future volume (e.g., use current live volume for current point in time and value zero for future volume), or mean future volume (e.g., assume future volume is average historical (e.g., 1-year) volume at different levels of granularity such as day of week, hour of day, etc.). In some examples, a machine learning model may be used to forecast demand to predict future volume.

Refresh frequency may include demand authority 206 (e.g., a computing system or service that stores and provides visibility into load record demands) receiving machine learning model feature values that include pricing requests either directly or indirectly from upstream services. Refreshing demand volume data may be performed continuously (e.g., use real-time demand data from the demand authority 206 for each incoming request for specific load attributes) or periodically (e.g., use data-warehouse to fetch and store data every hour through a completely offline process and use that data for incoming requests). In some examples, a third hybrid approach that combines both continuous and periodic may be suitable for purposes of the techniques described herein. For example, this may include, making calls to the demand authority 206 every few minutes (e.g., every 5, every 10, every 15, every 20, every 30, every 60, every 120, etc.) to get all unaccepted loads, grouping the loads based on a similar load definition described herein, storing all these groups value in a database, and using these values for new incoming requests. This solution may enable near real-time demand volume data, while also mitigating dependency/coupling issues with the demand authority 206.

The process 202 corresponds to an offline process that may be performed at a time prior to a user request coming in. For example, the offline process may generally include fetching current demand data from the demand authority 206 at some configurable value (e.g., every few minutes) and calculating and storing demand volume based on similar demands grouping definition. The process 204 corresponds to an online process that may include responding to requests from the user device 106. The architecture 200 may be implemented in a cloud computing platform or other arrangement using any suitable combination of resources, e.g., those shown and described herein.

With respect to the process 202, the architecture 200 includes an event tracking service 208, a workflow management service 210, a refresh compute service 212, the demand authority 206, a database 216, a storage service 218, and a machine learning platform 220. The event tracking service 208 may be configured to trigger certain actions given certain conditions. For example, the event tracking service 208 may kick of a workflow every X minutes at (1) to determine whether to update attributes. The workflow management service 210 may, at (2), poll the refresh compute service 212 to determine whether there has been any activity relating to a set of load records (e.g., an entire library of load records or a subset thereof). The workflow management service 210 may, at (3), fetch demand data, which may include data indicative of the demand for loads as presented using the load acceptance user interface and corresponding application(s), from the demand authority 206. The workflow management service 210 may, at (4), upload the demand data to the storage service 218. The workflow management service 210 may, at (5), invoke a grouping process at the machine learning platform 220. This may include using the machine learning platform 220 to generate one or more predictions, as described herein. At (6), the machine learning platform 220 may upload the transformed data to the storage service 218. The transformed data may include the new demand data that can be used for computing new values for the attributes, described herein. And, at (7) the workflow management service 210 may upload to the volume feature data to the database 26.

The online process, e.g., the process 204, may include the user device 106, at (1), requesting an optimized value. The optimized value may be a value of an attribute that has been generated using the techniques described herein. At (2), the demand authority 206 fetches the volume aware feature from the database 216. And, at (3), the demand authority 206 returns the optimized value to the user device 106. The user device 106 may then use the optimized value in place of an earlier value in the load record (e.g., an optimized price).

Figure 3:
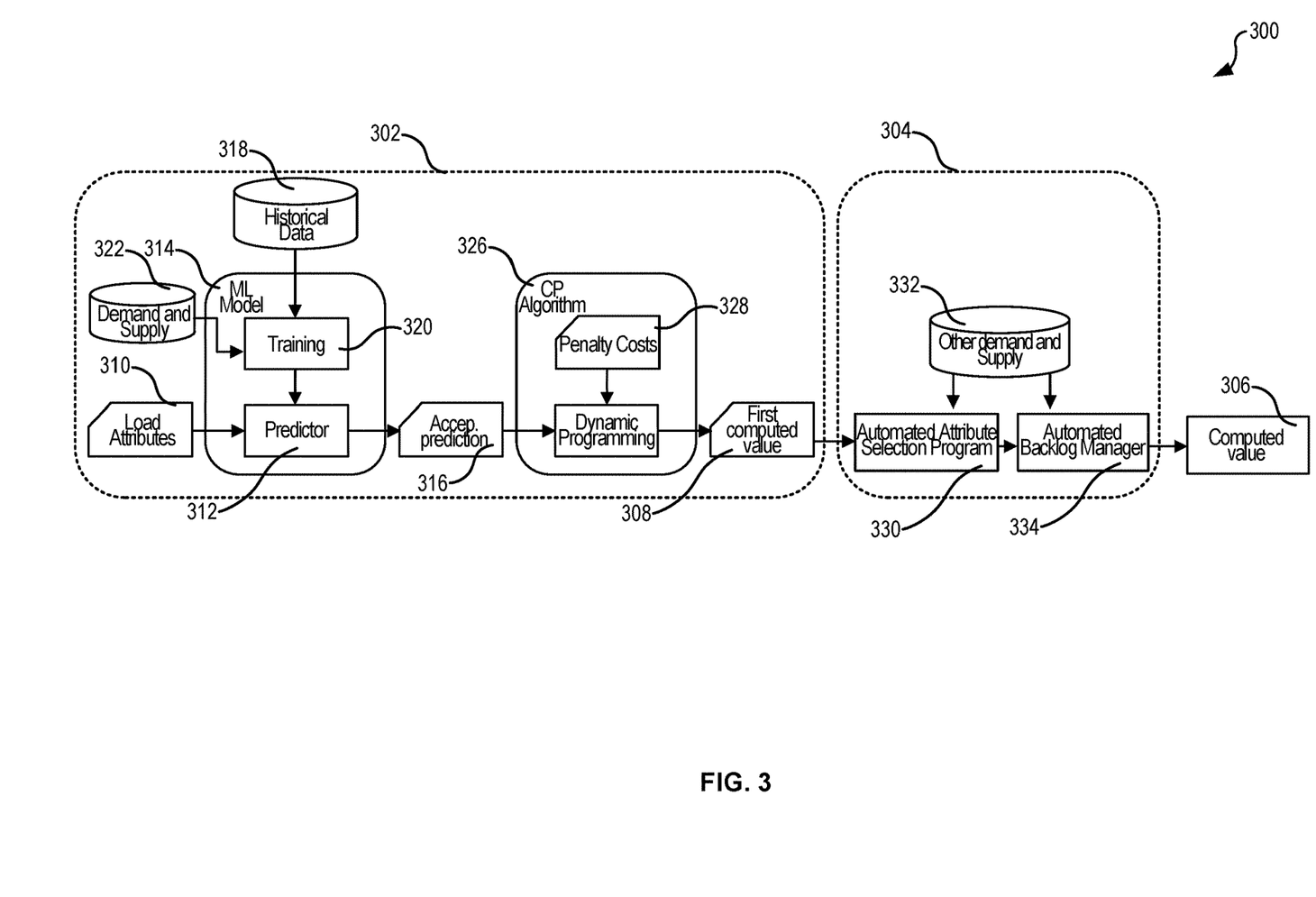
FIG. 3 illustrates an example multi-stage computing architecture and corresponding process for implementing techniques relating to dynamic generation and presentation of load records for load allocation, according to at least one example.

FIG. 3 illustrates an example multi-stage computing architecture (MSCA) 300 and corresponding process 302 for implementing techniques relating to dynamic generation and presentation of load records for load allocation, according to at least one example. The MSCA 300 may be suitable for determining a computed value 306 for an attribute (or a series of values) such as price using historical data, certain load board signals, carrier activity data (e.g., indicative of user supply), and load data (e.g., indicative of demand) such as those described with respect to FIG. 2.

The MSCA 300 may include a first stage 302 and a second stage 304. The first stage 302 may generally be configured to determine a first computed value 308 based on historical quote data 318 and demand and supply information 322 (e.g., contextual information).

The first stage 302 may include inputting load attributes 310 into a predictor 312 of a machine learning model 314. The load attributes 310 may represent attributes of a plurality of loads (e.g., length, origin, destination, truck and/or trailer required, out and back, one-way, price, pick up date, drop date, etc.). Other discussions of "attributes" herein may be similar to the previously-recited list of attributes. The machine learning model 314 may generally be configured to output an acceptance prediction 316. The acceptance prediction 316 may include a probability curve for a set of values of a particular attribute of a load record. For example, the probability curve, which may be specific to each load record, may define, for each price in a set of prices, a probability that the load record will be accepted by a carrier.

The machine learning model 314 may be generated using one or more artificial intelligence techniques. As used herein, the term "artificial intelligence" (AI) refers to any suitable computer-implemented artificial intelligence technique including, but not limited to, machine learning (ML) (supervised or unsupervised), natural language processing, machine perception, computer vision, affective computing, statistical learning and classification, Bayesian network models and Kalman filters, reinforcement learning including neural networks (e.g., convolutional neural networks (CNNs), recurrent neural networks (RNNs) such as Long short-term memory (LSTM), etc.), search algorithms and optimization algorithms (including evolutionary computing), heuristic-based algorithms, and automated reasoning. Non-limiting examples of classification algorithms include use of hidden Markov models, decision trees (e.g., boosting decision trees, random forests), support vector machines, etc.

Historical data 318 and demand and supply information 322 (e.g., contextual information) may be used for training 320 the machine learning model 314. For example, the training 320 may be performed and used to define the predictor 312. The historical data 318 may represent information about historical load records, which may include how values of the load records may have changed before being accepted. The demand and supply information 322 may represent contextual information and may be include information that is indicative of carrier activity and characteristics of available load routes. In some examples, the demand and supply information 322 may represent historical demand and supply information for a set of load routes. This may be used to compute the acceptance prediction 316, when the load attributes 310 are provided to the predictor 312.

The acceptance prediction 316 for a given load record may be provided to a dynamic programming algorithm 324 of a competitive programming algorithm 326.

In some examples, more carrier searches may be indicative of more potential carrier supply. For example, an increase in the number of carriers searching in a past time period (e.g., last 24 hours) may indicate an increase in carrier supply. In some examples, carrier searches and bookings over a 24-hour period may be probative of carrier supply.

Generally, the dynamic programming algorithm 324 may be configured to adjust the acceptance predictions 316 based on the number of carriers searching and booking similar loads at a point in time and the expected carrier activity for the future of that load. This is represented by the demand and supply information 322. In some examples, the competitive programming algorithm 326 may apply penalty costs 328 to the dynamic programming algorithm 324, as appropriate. Output of the dynamic programming algorithm 324 may include the first computed value 308, which may be a value for one of the attributes loaded at 310. For example, the first computed value may be a price value that is based at least in part on historical data 318 and demand and supply information 322.

The second stage 304 of the MSCA 300 may include inputting the first computed value 308 into an automated attribute selection program 330. Other demand and supply information 332 (e.g., other contextual information) may be input into the automated attribute selection program 330 and into an automated backlog manager 334. The other demand and supply information 332 may include at least some of the demand and supply information 322, which is representative of carriers and their respective interactions (e.g., carrier supply) and is representative of loads with which the carriers are able to interact (e.g., load demand). For example, this may include contextual information that has been collected in real-time (e.g., as part of simultaneous sessions in which the demand user interface is presented at user devices). Carrier activity may also be represented by carrier activity features, which may include, for example, carrier searches, carrier bookings, orders, carrier fleet size, email notifications, carrier rejections, carrier engagement metrics, and other similar features. In some examples, the carrier features relate to unique carriers who searched within some given time frame at origin domicile and unique carriers who booked within some given time frame at origin domicile. Load information may represent characteristics of loads presented to the carriers and how those loads relate to each other. For example, if a certain search results in a set of records that include similar attributes, except for a price, the load information may capture that the set of records was presented and the attributes thereof. This information may be meaningful when it comes time to determine what an appropriate price should be for those records that have not already been accepted.

The second stage 304 may generally be configured to compute the computed value 306, which may be a more highly refined version of the first computed value 308 and, in some examples, may represent a sequence of values for changing the values of an attribute over some time period.

Figure 4:
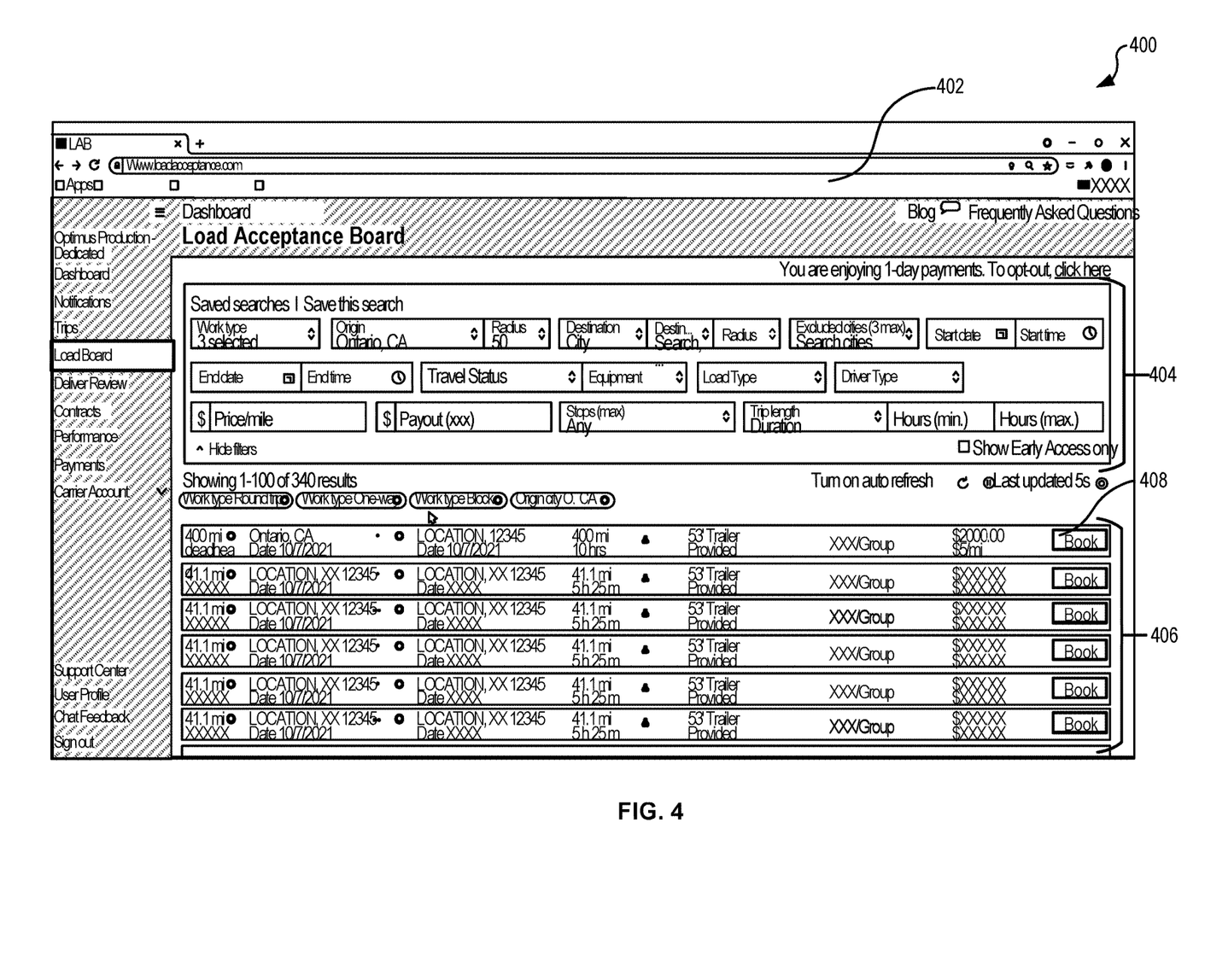
FIG. 4 illustrates an example user interface for implementing techniques relating to dynamic generation and presentation of load records for load allocation, according to at least one example.

FIG. 4 illustrates an example user interface 400 for implementing techniques relating to dynamic generation and presentation of load records for load allocation, according to at least one example. The user interface 400 is illustrated as being presented in a web application within a web browser 402. It should be understood that the user interface 400 may be presented on any suitable device using any suitable application. Information for populating the user interface 400 may be provided by the service provider 108 and the user interface 400 may be presented on the user device 106. In some examples, the user interface 400 is an example of the load acceptance user interface described herein.

The user interface 400 may include a search section 404 and an acceptance section 406, among other sections illustrated. The search section 404 may be used by a user to conduct a search of a set of load records. For example, the user may input information and/or select selectors within the search section 404 to define a search of load records that the user would be interested in accepting. Examples of search filters may include worktype, origin, radius with respect to origin, destination, radius with respect to destination, excluded cities, start date, start time, end date, end time, travel status, equipment, load type, driver, type, price per mile, payout, stops, trip length, and the like. These filters may correspond to the attributes described herein. A user may use the user interface 400 to generate a search query using the search section 404. This may be sent to the service provider to search a database of load records in order to populate load records in the acceptance section 406. For example, the acceptance section 406 may be used to present load records 408 that may be accepted given the search criteria.

The acceptance section 406 may be used to present load records 408 and provide user interface elements to enable user acceptance of a load record (e.g., "book" button). In some examples, each load record 408 may identify the type of route, the length, the origin, the date and time of departure, the destination and time of arrival, the length, the mileage, the equipment, the payout, and the price per mile. In some examples, selection of or hovering over different parts of the load record 408 may reveal additional information by way of popups, etc.

As described herein, the primary purpose of the user interface 400 may be to search and accept load routes. In some examples, as described herein, an additional purpose of the user interface 400 is to collect contextual information relating to how a set of users (e.g., carriers) interact with a set of presented load records 408. This may include representing the context of what the user is seeing when they are interacting with the set of load records 408. For example, what are the attributes of the other records, how are the attributes different, how are the attributes the same, etc. This may include representing the context present when a user searched, viewed, but declined to accept any routes. This may also include representing the context present when the user searched, viewed, and accepted a route at a later time. And may also include representing the context present when other users searched for similar routes. The may be represented by the carrier activity features described herein.

Figure 5:
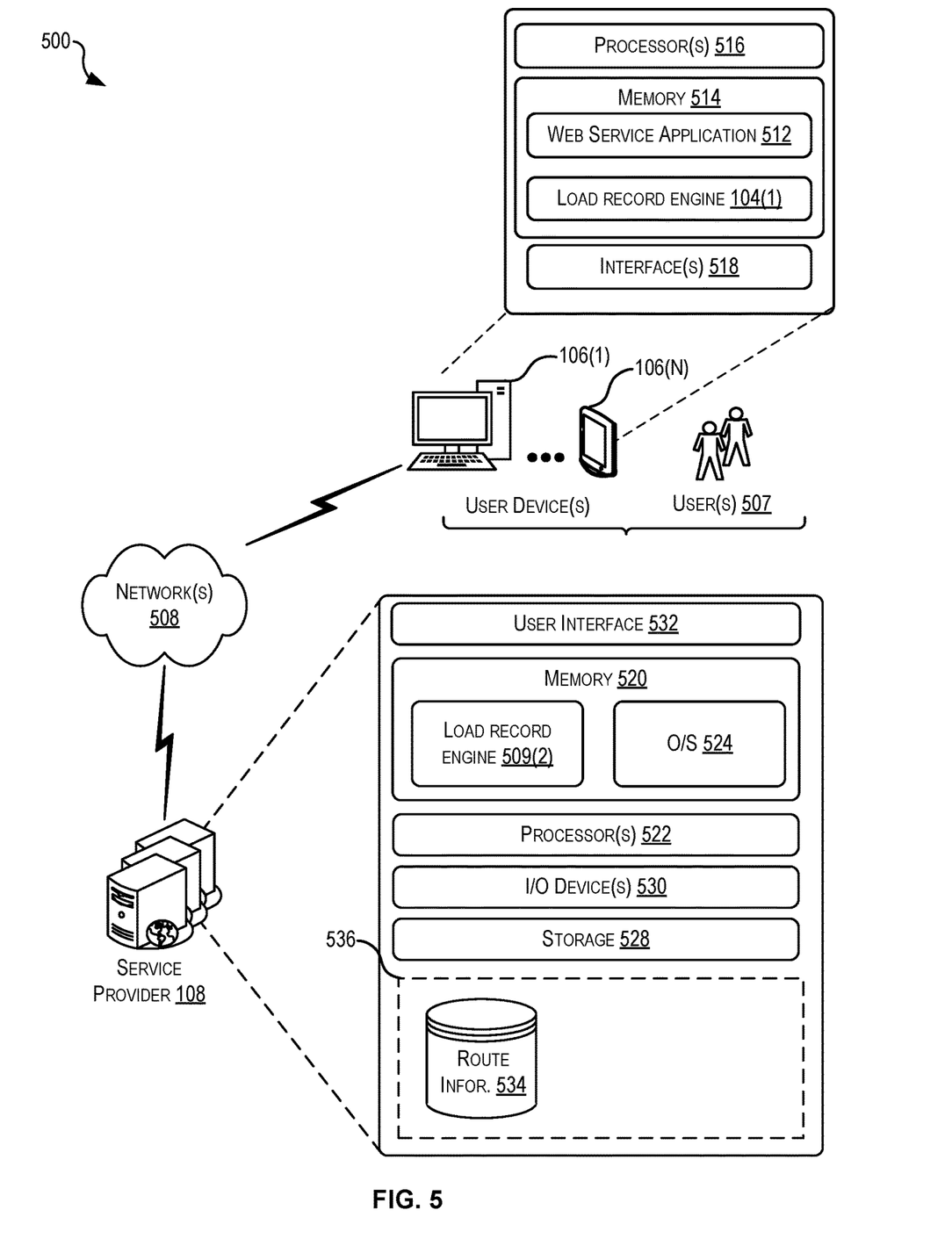
FIG. 5 illustrates an example schematic architecture for implementing techniques relating to dynamic generation and presentation of load records for load allocation, according to at least one example.

FIG. 5 is an example schematic architecture 500 for implementing techniques relating to dynamic generation and presentation of load records for load allocation, according to at least one example. The architecture 500 may include the service provider 108 in communication with one or more user devices 106(1)-106(N) via one or more networks 508 (hereinafter, "the network 508").

The user device 106 may be operable by one or more users 507 to interact with the service provider 108. The users 507 may be carriers or other users associated with carriers. The user device 106 may be any suitable type of computing device such as, but not limited to, a wearable device, a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 106(1) is illustrated as a desktop computer, while the user device 106(N) is illustrated as an example of a handheld mobile device.

The user device 106 may include a memory 514 and processor(s) 516. In the memory 514 may be stored program instructions that are loadable and executable on the processor(s) 516, as well as data generated during the execution of these programs. Depending on the configuration and type of user device 106, the memory 514 may be volatile (such as random access memory ("RAM")) and/or non-volatile (such as read-only memory (ROM), flash memory, etc.).

In some examples, the memory 514 may include a web service application 512 and a load record engine 509(1). The web service application 512 and/or load record engine 509(1) may allow the user 507 to interact with the service provider 108 via the network 508. The user device 106 may also include one or more interfaces 518 to enable communication with other devices, systems, and the like.

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment. The service provider 108 also may be implemented as part of a fulfillment network of an electronic store (not shown).

The service provider 108 may include at least one memory 520 and one or more processing units (or processor(s)) 522. The processor 522 may be implemented as appropriate in hardware, computer-executable instructions, software, firmware, or combinations thereof. Computer-executable instruction, software, or firmware implementations of the processor 522 may include computer-executable or machine-executable instructions written in any suitable programming language to perform the various functions described. The memory 520 may include more than one memory and may be distributed throughout the service provider 108. The memory 520 may store program instructions that are loadable and executable on the processor(s) 522, as well as data generated during the execution of these programs. Depending on the configuration and type of memory including the service provider 108, the memory 520 may be volatile (such as RAM and/or non-volatile (such as read-only memory ("ROM"), flash memory, or other memory). The memory 520 may include an operating system 524 and one or more application programs, modules, or services for implementing the features disclosed herein including at least the load record engine 509(2). For example, the load record engine 509(2) may perform the process 102 and may include the functionality described with reference to FIGS. 2 and 3.

The service provider 108 may also include additional storage 528, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 528, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the service provider 108 and/or part of the user device 106.

The service provider 108 may also include input/output (I/O) device(s) and/or ports 530, such as for enabling connection with a keyboard, a mouse, a pen, a voice input device, a touch input device, a display, speakers, a printer, or other I/O device.

In some examples, the service provider 108 may also include one or more user interface(s) 532. The user interface 532 may be utilized by an operator, curator, or other authorized user to access portions of the service provider 108. In some examples, the user interface 532 may include a graphical user interface, voice interfaces, web-based applications, programmatic interfaces such as APIs, or other user interface configurations. The service provider 108 may also include the datastore 536. In some examples, the datastore 536 may include one or more databases, data structures, or the like for storing and/or retaining information associated with the service provider 108. Thus, the datastore 536 may include data structures, such as a route information database 534. This database 534 may be used to store information about route records. In some examples, the route information database 534 is an example of the database 216.

Figure 6:
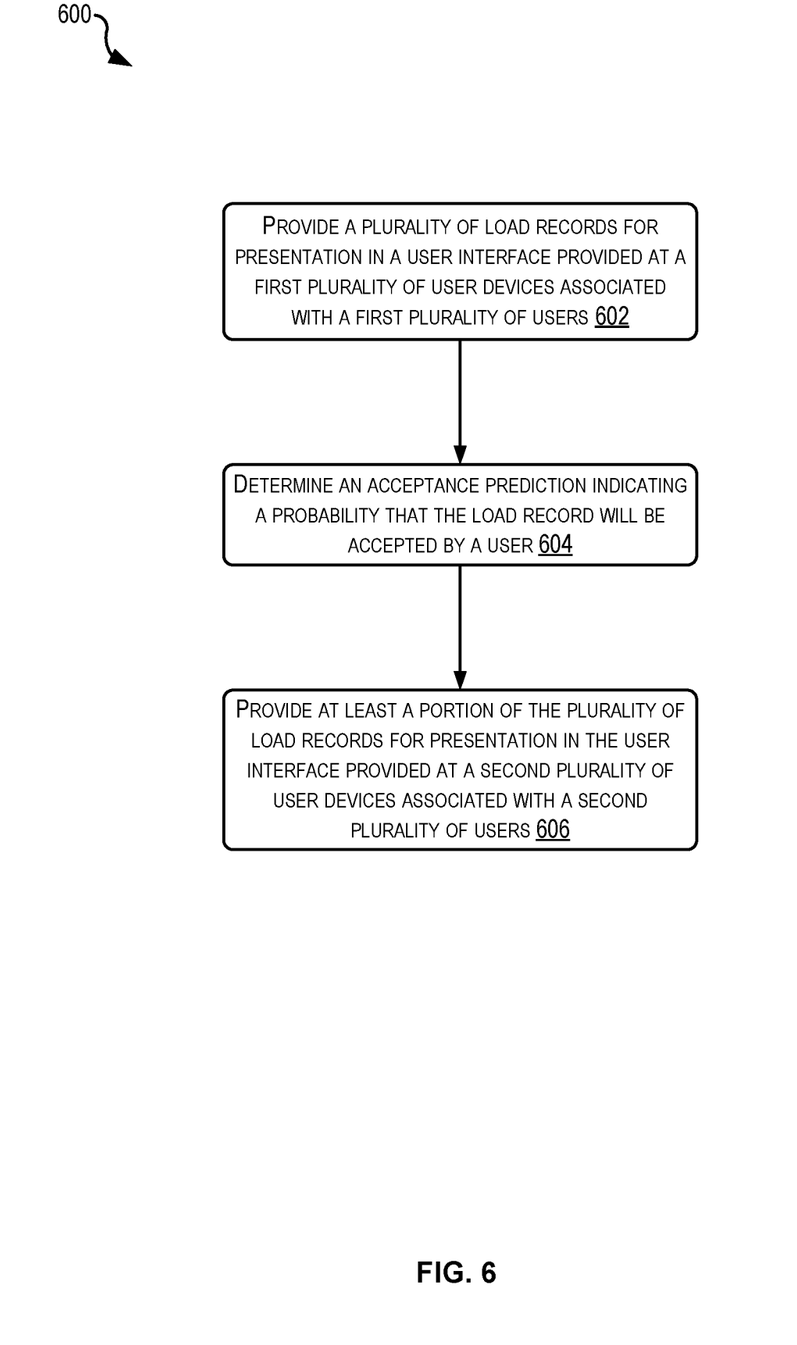
FIG. 6 is an example flow diagram depicting example acts for implementing techniques relating to dynamic generation and presentation of load records for load allocation, according to at least one example.
Figure 7:
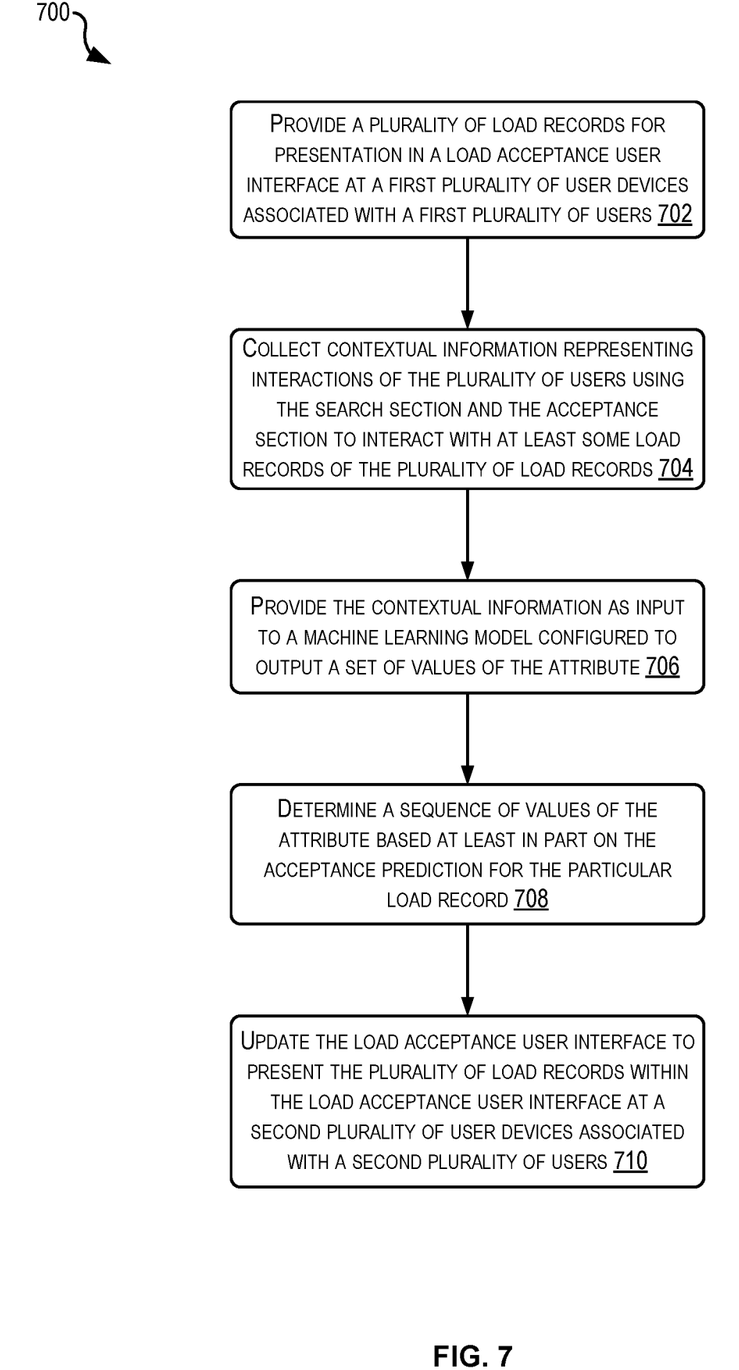
FIG. 7 is an example flow diagram depicting example acts for implementing techniques relating to dynamic generation and presentation of load records for load allocation, according to at least one example.

FIGS. 6 and 7 illustrate example flow diagrams showing respective processes 600 and 700, as described herein. These processes 600 and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 is a flow diagram of process 600 depicting example acts for implementing techniques relating to dynamic generation and presentation of load records for load allocation, according to at least one example. The load record engine 509 (FIG. 5) embodied in the service provider 108 (FIG. 1) and/or within the user device 106 (FIG. 1) may perform the process 600. Thus, while the description below is from the perspective of the service provider 108, the user device 106 may also perform the method with certain modifications.

The process 600 may begin at block 602 by the service provider 108 providing a plurality of load records for presentation in a user interface (e.g., 400) provided at a first plurality of user devices (e.g., 106) associated with a first plurality of users (e.g., 507). In this example, the user interface may enable searching for a plurality of loads represented by the plurality of load records, and viewing and accepting the plurality of loads.

At block 604, the process 600 may include determining an acceptance prediction indicating a probability that the load record will be accepted by a user. Determining the acceptance prediction may be determined for a load record of the plurality of load records and based at least in part on inputting contextual information into a predictive model, as described with respect to FIGS. 2 and 3. The contextual information may (i) represent interactions with the plurality of load records presented by the user interface, and (ii) be indicative of user supply.

In some examples, the process 600 may further include inputting the contextual information into the predictive model responsive to collecting the contextual information while providing the first plurality of load records for presentation in the user interface provided at the first plurality of user devices. Thus, the collecting may cause the predicting. This may occur when new contextual information is received, at some fixed cadence, or in any other manner. In some examples, the predictive model may include a machine learning model trained using attributes of historical load records and being configured to predict probabilities that load records will be accepted at various values of the attribute. In some examples, the predictive model may be configured to predict probabilities that load records will be accepted at various values of the attribute.

In some examples, the contextual information may further include demand information that represents quantity and similarity of load records within the first plurality of load records provided for presentation in the user interface. In some examples, the contextual information that is indicative of the user supply may include at least one of user clicks on the first plurality of load records, user search patterns with respect to the first plurality of load records, or user bookings with respect to the first plurality of load records. In some examples, determining the acceptance prediction may be further based at least in part on inputting historical information into the predictive model. The historical information may be representative of viewing interactions and accepting interactions with respect to the first plurality of load records. In some examples, the attribute may include a price associated with a load represented by the load record.

At block 606, the process 600 may include providing at least a portion of the plurality of load records for presentation in the user interface provided at a second plurality of user devices associated with a second plurality of users. The portion of the plurality of load records may include the load record that includes an updated value of an attribute of the load record that is dependent on the acceptance prediction.

In some examples, the process 600 may further include determining a sequence of values for the attribute of the load record based at least in part on the acceptance prediction, and changing the updated value using the sequence of values according to a frequency that is dependent on a different value of a different attribute of the load record. For example, the frequency may be based on the drop dead date attribute.

In some examples, providing the plurality of load records for presentation in the user interface at the first plurality of user devices may occur at a first time. In this example, providing the plurality of load records for presentation in the user interface may occur at the second plurality of user devices at a second time.

In some examples, the providing the plurality of load records for presentation in the user interface provided at the first plurality of user devices may include providing the first plurality of load records at a first time. In this example, providing the second plurality of load records for presentation in the user interface at the second plurality of user devices may include providing the second plurality of load records at a second time after the first time.

In some examples, the process 600 may further include collecting the contextual information when the first plurality of load records are presented in the user interface at the first plurality of user devices.

In some examples, the process 600 may further include determining, for the load record and based at least in part on inputting updated contextual information into the predictive model, an updated acceptance prediction indicating an updated probability that the load will be accepted by any user at a time after providing the plurality of load records for presentation in the user interface. In this example, the process 600 may further include providing the load record including a different updated value that is dependent on the updated acceptance prediction for presentation in the user interface at the second plurality of user devices. In some examples, providing may be based on the requesting.

FIG. 7 is a flow diagram of process 700 depicting example acts for implementing techniques relating to dynamic generation and presentation of load records for load allocation, according to at least one example. The load record engine 509 (FIG. 5) embodied in the service provider 108 (FIG. 1) and/or within the user device 106 (FIG. 1) may perform the process 700. Thus, while the description below is from the perspective of the service provider 108, the user device 106 may also perform the method with certain modifications.

The process 700 may begin at block 702 by the service provider 108 providing a plurality of load records for presentation in a load acceptance user interface at a first plurality of user devices associated with a first plurality of users. Providing may be performed at a first time. The load acceptance user interface may provide a search section for searching a plurality of loads represented by the plurality of load records, and an acceptance section for viewing and accepting the plurality of loads. The acceptance section may present a first value of an attribute of each load record, which may be responsive to user requests. Different combinations of load records may be provided to the different user devices.

At block 704, the process 700 may include collecting contextual information representing interactions of the plurality of users using the search section and the acceptance section to interact with at least some load records of the plurality of load records. The contextual information may be indicative of user supply with respect to individual loads of the plurality of loads presented using the load acceptance user interface at the first time.

At block 706, the process 700 may include providing the contextual information as input to a machine learning model configured to output, for each load record of the plurality of load records, an acceptance prediction. The acceptance prediction may indicate, for a set of values of the attribute, a probability that a respective load corresponding to the respective load record will be accepted by any user.

At block 708, the process 700 may include determining a sequence of values of the attribute based at least in part on the acceptance prediction for the particular load record. In some examples, the sequence of values of the attribute may be for a particular load record of the plurality of load records.

At block 710, the process 700 may include, updating the load acceptance user interface to present the plurality of load records within the load acceptance user interface at a second plurality of user devices associated with a second plurality of users. This may be performed responsive to determining the sequence of values. The updating may be performed at a second time. The load acceptance user interface may present a first value of the sequence of values of the attribute at the second time.

In some examples, the process 700 may further include, responsive to acceptance of the particular load record by a user of the second plurality of users: generating an acceptance record that indicates acceptance of the particular load record by the user, and removing the particular load record from presentation in the load acceptance user interface at the second time.

In some examples, at least some of the first plurality of users are the same users as at least some of the second plurality of users. In some examples, the contextual information may further include load demand information that is based at least in part on quantity and similarity of load records of the plurality of load records presented in the load acceptance user interface and available for acceptance between the first time and the second time. In some examples, the contextual information that is indicative of the user supply may include information that that is based at least in part on a quantity of active users viewing a subset of the plurality of load records at the first time.

Figure 8:
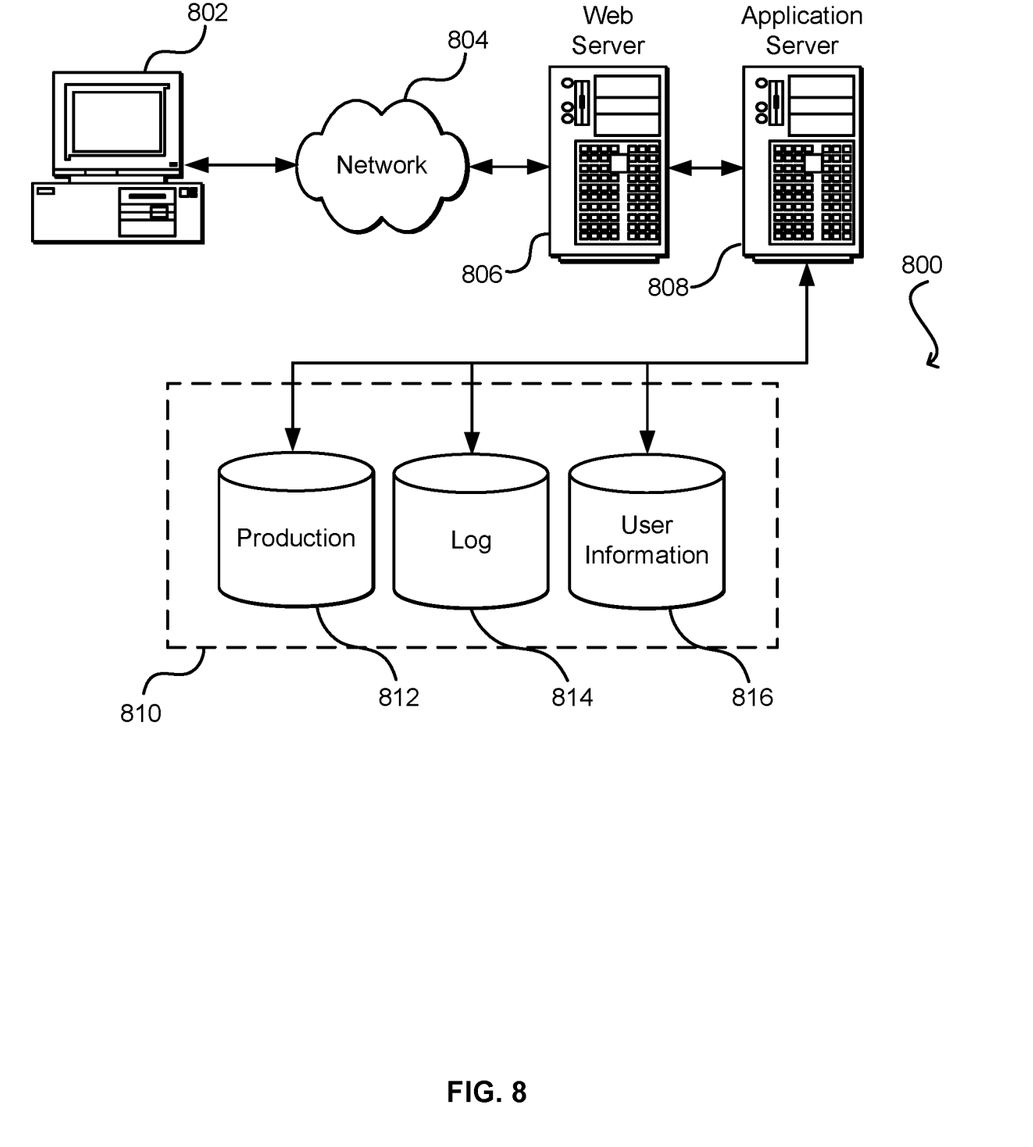
FIG. 8 is an example schematic environment for implementing techniques relating to dynamic generation and presentation of load records for load allocation, according to at least one example.

FIG. 8 illustrates aspects of an example environment 800 for implementing aspects in accordance with various examples. As will be appreciated, although a Web-based environment is used for purposes of explanation, different environments may be used, as appropriate, to implement various examples. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer executable instructions that, when executed by one or more processors of a computer system, cause the computer system to perform operations comprising:
   providing, at a first time, a plurality of load records for presentation in a load acceptance user interface at a first plurality of user devices associated with a first plurality of users, the load acceptance user interface providing:
      a search section for searching a plurality of loads represented by the plurality of load records; and
      an acceptance section for viewing and accepting the plurality of loads, the acceptance section presenting a first value of an attribute of each load record;
   collecting contextual information representing interactions of the first plurality of users using the search section and the acceptance section to interact with at least some load records of the plurality of load records, the contextual information indicative of user supply with respect to individual loads of the plurality of loads presented using the load acceptance user interface at the first time;

providing the contextual information as input to a machine learning model configured to output, for each load record of the plurality of load records, an acceptance prediction indicating, for a set of values of the attribute, a probability that a respective load corresponding to the respective load record will be accepted by any user;

determining, for a particular load record of the plurality of load records, a sequence of values of the attribute based at least in part on the acceptance prediction for the particular load record; and responsive to determining the sequence of values, updating, at a second time, the load acceptance user interface to present the plurality of load records within the load acceptance user interface at a second plurality of user devices associated with a second plurality of users, the load acceptance user interface presenting a first value of the sequence of values of the attribute at the second time.

2. The one or more non-transitory computer-readable media of claim 1, further comprising additional computer executable instructions that, when executed by the one or more processors, cause the computer system to perform additional operations comprising, responsive to acceptance of the particular load record by a user of the second plurality of users:

generating an acceptance record that indicates acceptance of the particular load record by the user; and removing the particular load record from presentation in the load acceptance user interface at the second time.

3. The one or more non-transitory computer-readable media of claim 1, wherein at least some of the first plurality of users are the same users as at least some of the second plurality of users.

4. The one or more non-transitory computer-readable media of claim 1, wherein the contextual information further comprises load demand information that is based at least in part on quantity and similarity of load records of the plurality of load records presented in the load acceptance user interface and available for acceptance between the first time and the second time.

5. The one or more non-transitory computer-readable media of claim 1, wherein the contextual information that is indicative of the user supply comprises information that that is based at least in part on a quantity of active users viewing a subset of the plurality of load records at the first time.

6. A computer-implemented method, comprising:

providing a plurality of load records for presentation in a user interface provided at a first plurality of user devices associated with a first plurality of users, the user interface enabling searching for a plurality of loads represented by the plurality of load records, and viewing and accepting the plurality of loads;

determining, for a load record of the plurality of load records and based at least in part on inputting contextual information into a predictive model, an acceptance prediction indicating a probability that the load record will be accepted by a user, the contextual information (i) representing interactions with the plurality of load records presented by the user interface, and (ii) being indicative of user supply; and responsive to determining a sequence of values, providing at least a portion of the plurality of load records for presentation in the user interface provided at a second plurality of user devices associated with a second plurality of users, the portion of the plurality of load records comprising the load record including an updated value of the sequence of values corresponding to an attribute of the load record that is dependent on the acceptance prediction.

7. The computer-implemented method of claim 6, wherein determining the acceptance prediction is further based at least in part on inputting historical information into the predictive model, the historical information representative of viewing interactions and accepting interactions with respect to the plurality of load records.

8. The computer-implemented method of claim 6, further comprising inputting the contextual information into the predictive model responsive to collecting the contextual information while providing the plurality of load records for presentation in the user interface provided at the first plurality of user devices.

9. The computer-implemented method of claim 6, wherein the predictive model comprises a machine learning model trained using attributes of historical load records and being configured to predict probabilities that load records will be accepted at various values of the attribute.

10. The computer-implemented method of claim 6, wherein responsive to determining the sequence of values comprises determining the sequence of values for the attribute of the load record based at least in part on the acceptance prediction, and wherein the method further comprises changing the updated value using the sequence of values according to a frequency that is dependent on a different value of a different attribute of the load record.

11. The computer-implemented method of claim 6, wherein the contextual information further comprises demand information that represents quantity and similarity of load records within the plurality of load records provided for presentation in the user interface.

12. The computer-implemented method of claim 6, further comprising determining the updated value of the attribute of the load record by at least inputting the acceptance prediction into a dynamic programming algorithm.

13. The computer-implemented method of claim 6, wherein the attribute comprises a price associated with a load represented by the load record.

14. The computer-implemented method of claim 6, wherein the contextual information being indicative the user supply comprises carrier activity features comprising at least one of user clicks on the plurality of load records, user search patterns with respect to the plurality of load records, or user bookings with respect to the plurality of load records.

15. The computer-implemented method of claim 6, wherein providing the plurality of load records for presentation in the user interface provided at the first plurality of user devices comprises providing the plurality of load records at a first time, and wherein providing the plurality of load records for presentation in the user interface at the second plurality of user devices comprises providing the plurality of load records at a second time after the first time.

16. The computer-implemented method of claim 15, further comprising collecting the contextual information when the plurality of load records are presented in the user interface at the first plurality of user devices.

17. A system, comprising:

a memory configured to store computer-executable instructions; and a processor configured to access the memory and execute the computer-executable instructions to at least:

provide a plurality of load records for presentation in a user interface provided at a first plurality of user devices associated with a first plurality of users, the user interface enabling searching for a plurality of loads represented by the plurality of load records, and viewing and accepting the plurality of loads;

determine, for a load record of the plurality of load records and based at least in part on inputting contextual information into a predictive model, an acceptance prediction indicating a probability that the load record will be accepted by a user, the contextual information (i) representing interactions with the plurality of load records presented by the user interface, and (ii) being indicative of user supply; and responsive to determining a sequence of values, provide at least a portion of the plurality of load records for presentation in the user interface provided at a second plurality of user devices associated with a second plurality of users, the portion of the plurality of load records comprising the load record including an updated value of the sequence of values corresponding to an attribute of the load record that is dependent on the acceptance prediction.

18. The system of claim 17, wherein the predictive model is configured to predict probabilities that load records will be accepted at various values of the attribute.

19. The system of claim 17, wherein the memory is configured to store additional computer-executable instructions, and the processor is further configured to execute the additional computer-executable instructions to at least:

determine, for the load record and based at least in part on inputting updated contextual information into the predictive model, an updated acceptance prediction indicating an updated probability that a load associated with the load record will be accepted by any user at a time after providing the plurality of load records for presentation in the user interface; and provide the load record including a different updated value that is dependent on the updated acceptance prediction for presentation in the user interface at the second plurality of user devices.

20. The system of claim 17, wherein providing the plurality of load records for presentation in the user interface provided at the first plurality of user devices comprises providing the plurality of load records at a first time, and wherein providing the plurality of load records for presentation in the user interface at the second plurality of user devices comprises providing the plurality of load records at a second time after the first time.

* * * * *